United States Patent
Sugimoto et al.

(10) Patent No.: US 9,656,603 B2
(45) Date of Patent: May 23, 2017

(54) VEHICLE INTERIOR ILLUMINATION DEVICE

(71) Applicants: Yazaki Corporation, Minato-ku, Tokyo (JP); TOYOTA SHATAI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Terumitsu Sugimoto, Makinohara (JP); Hiroko Aono, Makinohara (JP); Yasushi Ohba, Makinohara (JP); Nobuyoshi Imaeda, Kariya (JP); Makoto Sunohara, Kariya (JP); Hisanori Kato, Kariya (JP); Masahiro Kasai, Toyota (JP)

(73) Assignees: YAZAKI CORPORATION, Tokyo (JP); TOYOTA SHATAI KABUSHIKI KAISHA, Aichi-ken (JP); TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 15/002,519

(22) Filed: Jan. 21, 2016

(65) Prior Publication Data
US 2016/0214530 A1 Jul. 28, 2016

(30) Foreign Application Priority Data
Jan. 23, 2015 (JP) .................. 2015-011418

(51) Int. Cl.
*B60Q 1/14* (2006.01)
*B60Q 3/02* (2006.01)
(Continued)

(52) U.S. Cl.
CPC ............ *B60Q 3/0293* (2013.01); *B60Q 3/80* (2017.02); *B60Q 3/76* (2017.02)

(58) Field of Classification Search
CPC .................................................. B60Q 3/0293
(Continued)

(56) References Cited

U.S. PATENT DOCUMENTS 5,130,901 A * 7/1992 Priesemuth .......... B60Q 3/0293
362/276
6,536,928 B1 * 3/2003 Hein ..................... B60Q 1/323
116/28.1
(Continued)

FOREIGN PATENT DOCUMENTS

JP  2005-193804 A  7/2005
JP  2006-44567 A  2/2006
WO 2014/032971 A1  3/2014

OTHER PUBLICATIONS

Communication dated Oct. 11, 2016 issued by European Patent Office in counterpart European Patent Application No. 16151342.9.

*Primary Examiner* — Thuy Vinh Tran
(74) *Attorney, Agent, or Firm* — Sughrue Mion, PLLC

(57) ABSTRACT

A vehicle interior illumination device includes an illumination lamp that is provided in a vehicle interior and is configured to be turned on to illuminate the vehicle interior, a detector that detects a condition to have the illumination lamp to be turned on, and a controller that controls a lighting of the illumination lamp. When the condition is detected by the detector, the controller lights the illumination lamp with a first light amount and when the condition is not detected by the detector, the controller lights the illumination lamp with a second light amount smaller than the first light amount.

7 Claims, 5 Drawing Sheets

(51) Int. Cl.
*B60Q 3/80* (2017.01)
*B60Q 3/76* (2017.01)

(58) Field of Classification Search
USPC ............... 362/471, 488–492; 307/10.1, 10.8; 315/77
See application file for complete search history.

(56) References Cited

U.S. PATENT DOCUMENTS

| | | | |
|---|---|---|---|
| 6,935,763 B2* | 8/2005 | Mueller | B60H 1/00985 362/230 |
| 8,400,061 B2* | 3/2013 | Kuang | B60Q 3/0259 315/291 |
| 2006/0279959 A1 | 12/2006 | Yabashi et al. | |
| 2008/0112175 A1 | 5/2008 | Bucher | |
| 2011/0025208 A1 | 2/2011 | Yamashita et al. | |

* cited by examiner

VEHICLE INTERIOR ILLUMINATION DEVICE

CROSS REFERENCE TO RELATED APPLICATIONS

This application is based on Japanese Patent Application (No. P 2015-011418) filed on Jan. 23, 2015, the contents of which are incorporated herein by reference.

BACKGROUND OF THE INVENTION

1. Field of the Invention

The present invention relates to a vehicle interior illumination device in a vehicle.

2. Description of the Related Art

Recently, a personal lamp that can be used, for example, by a passenger sitting on a rear seat is set on a roof, a pillar or the like in a vehicle. The personal lamp is an illumination lamp that illuminates the rear seat. The personal lamp is lit not only when a lighting switch operated by a passenger at the time of reading but also when a door switch detecting that a rear seat side door is open is turned on or a seat belt switch detecting that a seat belt is not fastened is turned on. This illumination by the personal lamp is called functional illumination.

Moreover, a related art discloses that when the entire vehicle interior is illuminated by a monitor attached to a ceiling of a vehicle interior, light is emitted with a variable light amount and color shade and the vehicle interior is garnished with an illumination matching the mood of the passengers or the like and the atmosphere (see JP-A-2006-44567). This illumination is called atmospheric illumination.

However, when an illumination lamp for the atmospheric illumination is set in the vehicle interior, since it is set in addition to an illumination lamp for the functional illumination set on the rear seat side, the number of illumination lamps increases.

Moreover, when an illumination lamp for the atmospheric illumination is provided in addition to an illumination lamp for the functional illumination, it is unclear how to use the functional illumination and the atmospheric illumination each in its proper way. That is, the atmospheric illumination is low in illuminance since it dimly illuminates the vehicle interior in order that the driver confirms the safety of the rear seat while driving or to provide the vehicle interior with a unique atmosphere. On the other hand, the functional illumination is high in illuminance since it is used when a passenger is informed that a door is open or that the seat belt is not fastened or when a passenger performs reading. As described above, the functional illumination and the atmospheric illumination are different in light amount and it is necessary to use them each in its proper way.

SUMMARY OF THE INVENTION

The present invention is made in view of the above-described circumstances, and an object thereof is to provide a vehicle interior illumination device in which the functional illumination and the atmospheric illumination are used each in its proper way by using an illumination lamp capable of being turned on at a side of a seat without any increase in the number of illumination lamps.

To attain the above-mentioned object, a vehicle interior illumination device according to the present invention are characterized by the following [1] to [6].

[1] A vehicle interior illumination device mounted on a vehicle includes:

an illumination lamp that is provided in a vehicle interior and is configured to be turned on to illuminate the vehicle interior;

a detector that detects a condition to have the illumination lamp to be turned on; and a controller that controls a lighting of the illumination lamp, wherein when the condition is detected by the detector, the controller lights the illumination lamp with a first light amount and when the condition is not detected by the detector, the controller lights the illumination lamp with a second light amount smaller than the first light amount.

According to the above configuration, the functional illumination with a high illuminance and the atmospheric illumination with a low illuminance can be used each in its proper way by using the illumination lamp capable of being turned on without any increase in the number of illumination lamps. Moreover, by placing priority on the functional illumination, the atmospheric illumination can be easily introduced without any significant changes from the usage of the related illumination lamp.

[2] In the vehicle interior illumination device according to the above [1], the illumination lamp is provided in the vehicle interior on a side of a seat in a rear of a driver seat and is configured to be turned on to illuminate the side of the seat in the rear of the driver seat; and the vehicle interior on a side of the driver seat is a space not light-intercepted from the vehicle interior on the side of the seat in the rear of the driver seat.

According to the above configuration, the vehicle interior including the side of the seat in the rear can be uniformly illuminated by using the illumination lamp capable of being turned on at the side of the seat in the rear, so that the atmospheric illumination can be made more effective.

[3] In the vehicle interior illumination device according to the above [1] or [2], the detector detects an operation for turning on the illumination lamp or an operation interlocking with a vehicle as the condition to have the illumination lamp to be turned on.

According to this vehicle interior illumination device, since operations interlocking with the vehicle such as door opening in addition to the turning on by a passenger brings the condition where the illumination lamp is lit, the role as the functional illumination can be fulfilled as before.

[4] The vehicle interior illumination device according to any of the above [1] to [3] further includes: an instruction portion that is configured to instruct a low illuminance mode for lighting the illumination lamp with the second light amount, wherein when the low illuminance mode is instructed by the instruction portion and the condition is not detected by the detector, the controller lights the illumination lamp with the second light amount.

According to this vehicle interior illumination device, since the illumination lamp is lit with the second light amount by instructing the low illuminance mode, the driver can freely set the atmospheric illumination.

[5] In the vehicle interior illumination device according to the above [4], when the condition is detected by the detector while the illumination lamp is lit with the second light amount, the controller cancels the low illuminance mode and lights the illumination lamp with the first light amount, and thereafter, when the condition becomes undetected, the controller sets the low illuminance mode again and lights the illumination lamp with the second light amount.

According to this vehicle interior illumination device, when the low illuminance mode is set and at times other than at the time of the functional illumination, the illumination is always the atmospheric illumination.

[6] In the vehicle interior illumination device according to the above [4] or [5], the controller concurrently lights a plurality of illumination lamps with the second light amount.

According to this vehicle interior illumination device, since a plurality of personal lamps are concurrently lit with the second illuminance, the effect as the atmospheric illumination can be enhanced.

According to the present invention, the functional illumination and the atmospheric illumination can be used each in its proper way by using the illumination lamp capable of being turned on at the side of a seat without any increase in the number of illumination lamps.

The present invention has been briefly described above. Further, details of the present invention will be further clarified by reading through the mode for carrying out the invention (hereinafter, referred to as "embodiment") described below with reference to the attached drawings.

DETAILED DESCRIPTION OF THE EXEMPLARY EMBODIMENTS

Figure 1:
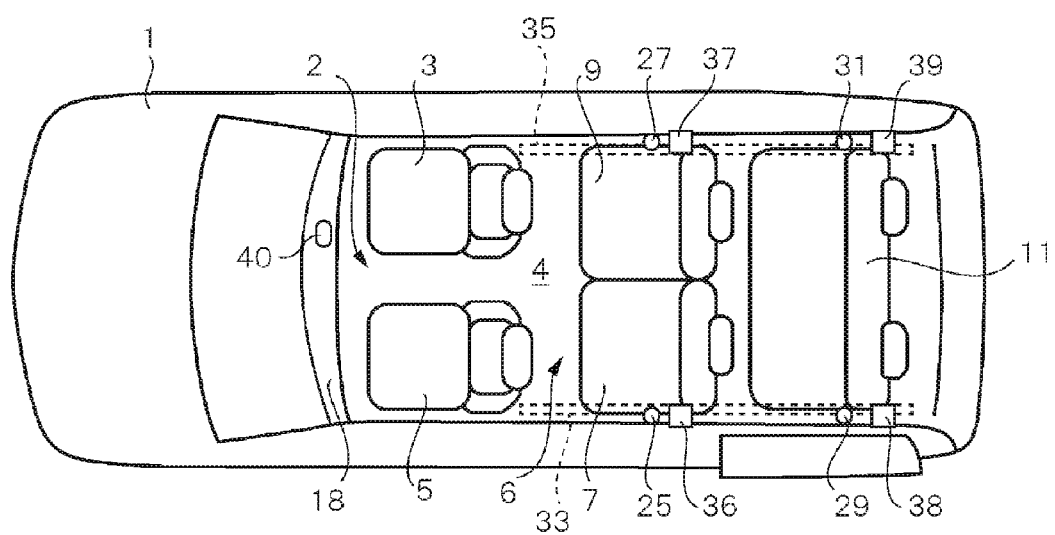
FIG. 1 is a view, viewed from above, of a vehicle interior of a vehicle where a vehicle interior illumination device of an embodiment is mounted.
Figure 2:
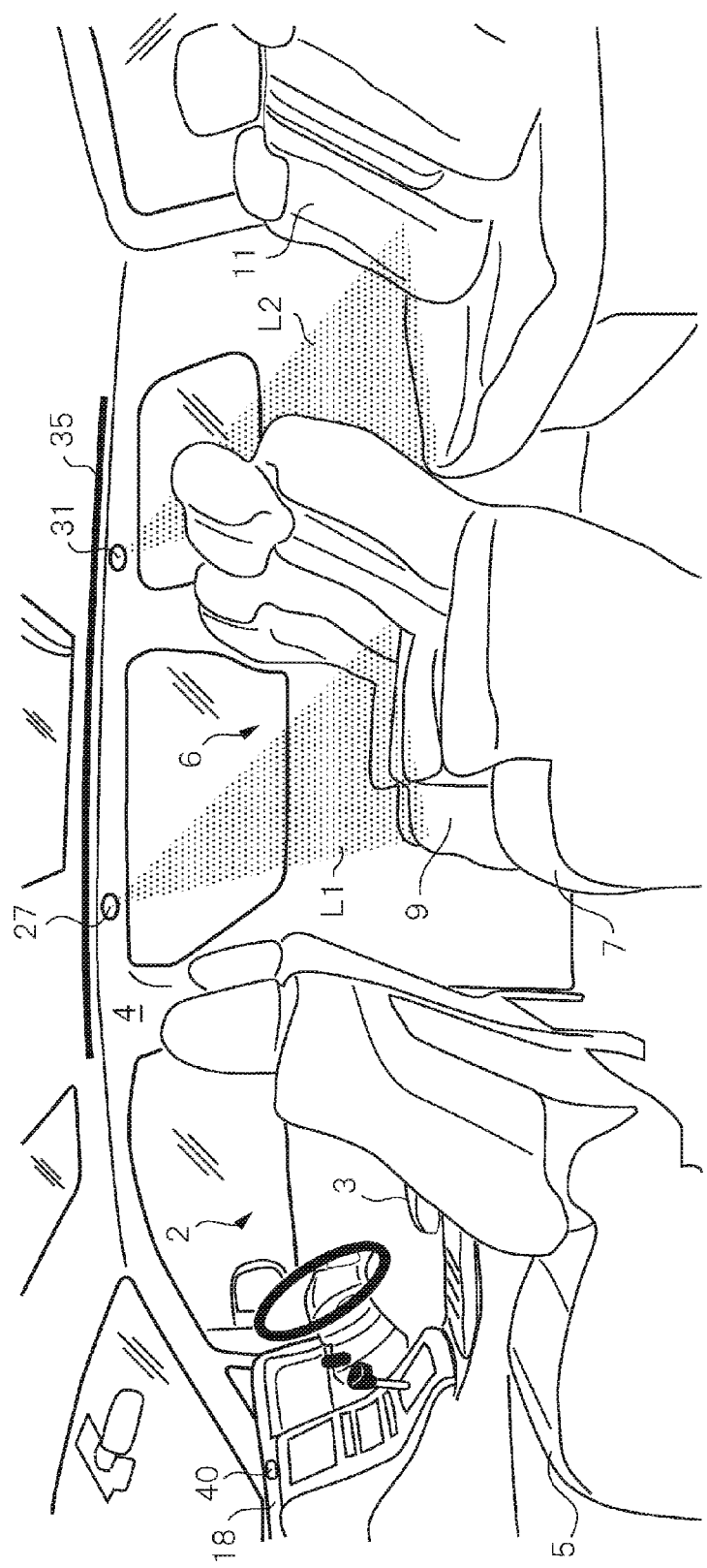
FIG. 2 is a view illustrating the vehicle interior viewed from a side of the vehicle.

Hereinafter, a vehicle interior illumination device according to the present embodiment will be described by using the drawings. FIG. 1 is a view, viewed from above, of a vehicle interior 4 of a vehicle 1 where the vehicle interior illumination device 10 of the present embodiment is mounted. The vehicle 1 is a minivan for seven people where seats are provided in three rows. FIG. 2 is a view illustrating the vehicle interior 4 viewed from a side of the vehicle 1. The vehicle interior 4 is broadly divided into a front vehicle interior 2 on the side of a driver seat 3 and a rear vehicle interior 6 on the side of passengers (occupants). The front vehicle interior 2 is a space not separated from the rear vehicle interior 6 and not light-intercepted from the rear vehicle interior 6.

On the trim covers above the sides of middle seats 7 and 9 of the rear vehicle interior 6, personal lamps 25 and 27 and personal switches 36 and 37 are disposed. Likewise, on the trim covers above both sides of a rear seat 11 of the rear vehicle interior 6, personal lamps 29 and 31 and personal switches 38 and 39 are disposed, respectively.

The personal switches 36, 37, 38 and 39 are switches that can be operated by the passengers (occupants) sitting on the seats, and when the personal switches 36, 37, 38 and 39 are turned on respectively, the personal lamps 25, 27, 29 and 31 are lit with a high illuminance (light amount 100%) as the functional illumination correspondingly. The personal lamps 25, 27, 29 and 31 are lit not only when the personal switches 36, 37, 38 and 39 are turned on by the passengers sitting on the seats but also at times such as when the doors beside the seats are open and when the passengers do not fasten the seat belts as operations interlocking with the vehicle 1.

On the other hand, a lounge mode setting switch 40 that can be operated by the driver is disposed on an instrument panel 18 disposed in front of the driver seat 3 and a front passenger seat 5 of the front vehicle interior 2. The lounge mode setting switch 40 (instruction portion) is a switch for dimly illuminating the vehicle interior to provide a unique atmosphere as described later, and when the lounge mode setting switch 40 is turned on, a mode (low illuminance mode) is set in which the personal lamps 25, 27, 29 and 31 are always on with a low illuminance (light amount 20%) as the atmospheric illumination. Here, the light amount 20% set as the low illuminance is a light amount where it is assumed that the illumination of the personal lamp is not reflected on the windshield on the side of the driver seat 3, and is one example. In both of the functional illumination and the atmospheric illumination, as illustrated in FIG. 2, the personal lamps 27 and 31 emit illumination lights L1 and L2 toward the rear of the vehicle interior 4 to the middle seat 9 and the rear seat 11, respectively. The same applies to the personal lamps 25 and 29.

Moreover, on both right and left sides of the ceiling in the vehicle interior 4, ceiling illuminations 33 and 35 that uniformly illuminates the rear vehicle interior 6 are disposed.

Figure 3:
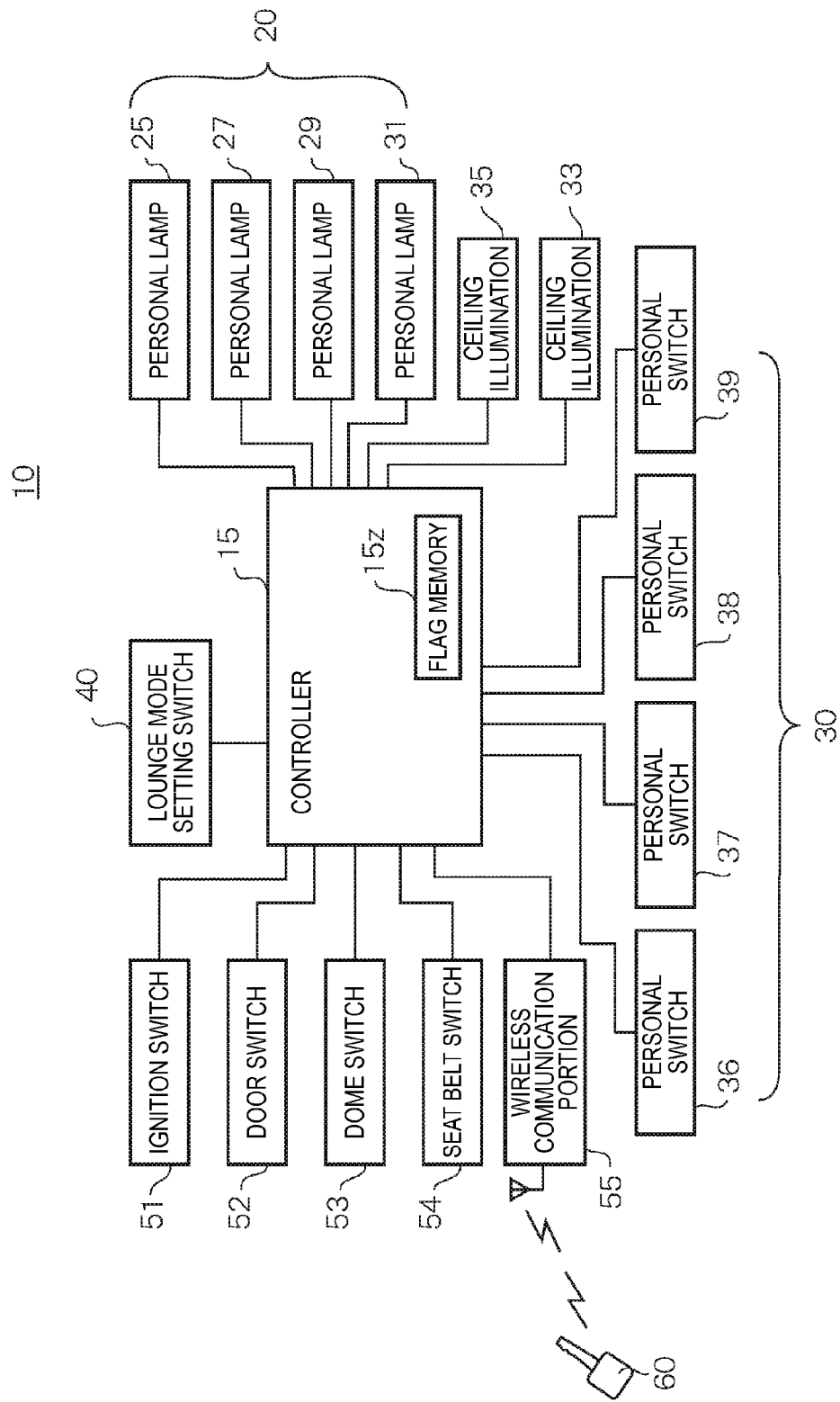
FIG. 3 is a block diagram illustrating the structure of the vehicle interior illumination device

FIG. 3 is a block diagram illustrating the structure of the vehicle interior illumination device 10. The vehicle interior illumination device 10 mainly includes a controller 15 formed of an ECU (electric control unit). The controller 15 incorporates a known CPU, ROM and the like, and the CPU executes an operation program stored in the ROM to thereby perform centralized control of the elements of the vehicle interior illumination device 10. Moreover, the controller 15 has a flag memory 15z that stores the states of a flag A, a flag B and a flag C that are set or reset with the execution of the operation program described later.

To the controller 15, the following are connected: the lounge mode setting switch 40; an ignition (IG) switch 51; a door switch 52; a dome switch 53; a seat belt switch 54; and personal switches 36 to 39.

The IG switch 51 is operated by the driver. The vehicle is brought into driving state by turning on the IG switch 51. The door switch 52 (detector) detects the opening and closing operation of each door and also detects a door locking operation or a door unlocking operation of each door. For example, the door switch 52 detects the opening and closing operation of each door, a door locking operation, or a door unlocking operation of each door based on signals generated by these operations respectively.

The dome switch 53 is a switch capable of turning on a dome illumination mounted on the ceiling of the vehicle interior 4. The seat belt switch 54 is provided for each seat, and detects the presence or absence of the fastening of the seat belt. The personal switches 36 to 39 are switches capable of turning on the personal lamps 25, 27, 29 and 31, respectively, by the passengers sitting on the seats, and output the on/off states thereof to the controller 15. When it is not specifically necessary to distinguish the personal switches 36 to 39 from one another, they will be collectively called personal switch 30.

The lounge mode setting switch 40 is disposed on the instrument panel 18 as mentioned above. When the lounge mode setting switch 40 is turned on by the driver, the vehicle interior illumination device 10 shifts to a lounge mode. At the time of starting of an activation of an engine in the vehicle, the lounge mode setting switch 40 is set to off.

Moreover, the ceiling illuminations 33 and 35, the personal lamps 25, 27, 29 and 31 and a wireless communication portion 55 are connected to the controller 15.

The ceiling illuminations 33 and 35 are disposed on both right and left sides of the ceiling of the vehicle interior 4 as mentioned above, and uniformly illuminate the vehicle interior 4. The personal lamps 25, 27, 29 and 31 illuminate the middle seat 7 on the left side, the middle seat 9 on the right side, the rear seat 11 on the left side and the rear seat 11 on the right side, respectively. In particular, when it is unnecessary to distinguish the personal lamps from one another, they will be collectively called personal lamp 20. The personal lamp 20 is driven by the controller 15 performing PWM control, and is variably lit within a duty ratio range of 0% to 100%, that is, within a light amount range of 0% to 100%.

Moreover, the personal lamp 20 is lit with the high illuminance (light amount 100%) as the functional illuminance when the personal switch 30 is turned on by the passengers setting on the seats. Also, the personal lamp 20 is lit with the high illuminance (light amount 100%) at times such as when the passengers setting on the seats open the doors, when a door unlocking operation is performed, when the passengers do not fasten the seat belts and when the dome illumination is lit as operations interlocking with the vehicle 1. The personal lamp 20 is always on with the low illuminance (light amount 20%) as the atmospheric illumination when the lounge mode setting switch 40 is turned on by the driver and the vehicle interior illumination device 10 shifts to the lounge mode. The personal lamp 20 may be an LED, an LCD, an organic EL, an electric bulb or the like, and is not limited to a specific kind.

The wireless communication portion 55 performs near field communication with a smart key 60 possessed by the driver. When the smart key 60 approaches within a predetermined distance, the wireless communication portion 55 detects the approach and outputs an approach detection signal to the controller 15, and when a security cancellation operation is performed by the driver on the smart key 60, the wireless communication portion 55 receives the cancellation signal from the smart key 60 and outputs the cancellation signal to the controller 15. When the approach detection signal or the cancellation signal is received, the controller 15 lights the personal lamp 20 with the high illuminance.

The IG switch 51, the door switch 52, the dome switch 53, the seat belt switch 54, the wireless communication portion 55 and the like are examples of vehicle interlocking switches that detect operations interlocking with the vehicle.

Figure 4:
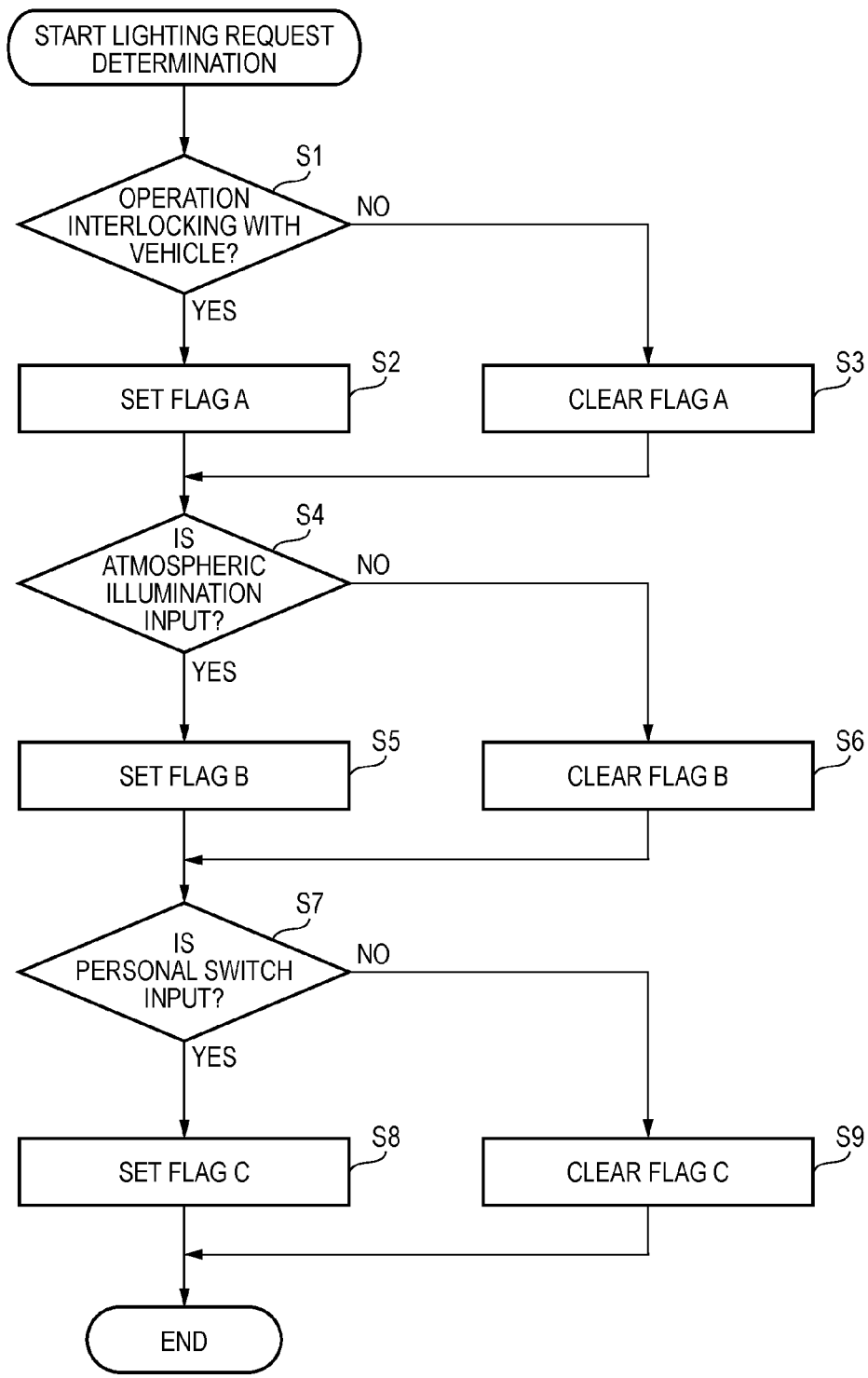
FIG. 4 is a flowchart illustrating a lighting request determination processing procedure.

An operation of the vehicle interior illumination device 10 having the above-described structure will be illustrated. FIG. 4 is a flowchart illustrating a lighting request determination processing procedure. This operation program is stored in the ROM in the controller 15, and executed by the CPU in the controller 15.

The controller 15 determines the state of the door switch 52 as an example of a vehicle interlocking switch that performs an operation interlocking with the vehicle 1 (S1). When the door switch 52 is on, that is, when a door is open or an unlocking operation has been performed, the controller 15 sets the flag A stored in the flag memory 15z to value 1 (S2). At this time, the controller 15 also stores into the flag memory 15z the identification information of the door switch as a factor that causes the flag A to be set or the personal lamp disposed close thereto. On the other hand, when the door switch 52 is off, that is, when the door is closed and a door locking operation has been performed, the controller 15 clears the flag A stored in the flag memory 15z to value 0 to reset it (S3).

Then, the controller 15 determines whether the lounge mode setting switch 40 for performing the atmospheric illumination is on or not (S4). When the lounge mode setting switch 40 is on, the controller 15 sets the flag B stored in the flag memory 15z to value 1 (S5). On the other hand, when the lounge mode setting switch 40 is off, the controller 15 clears the flag B to value 0 to reset it (S6).

Then, the controller 15 determines whether any one of the personal switches 36, 37, 38 and 39 is on or not (S7). When any one of the personal switches 36, 37, 38 and 39 is on, the controller 15 sets the flag C stored in the flag memory 15z to value 1 (S8). At this time, the controller 15 also stores into the flag memory 15z the identification information of the personal switch as a factor that causes the flag C to be set or the personal lamp disposed close thereto. On the other hand, when all of the personal switches 36, 37, 38 and 39 are off, the controller 15 clears the flag C to value 0 to reset it (S9). Thereafter, the controller 15 ends the present operation.

While the case of the door switch capable of detecting a door opening operation and a door unlocking operation is illustrated here as an example of the operation interlocking with the vehicle, the case of the seat belt switch capable of detecting that the seat belt is not fastened, the dome switch capable of turning on the dome illumination, the ignition switch capable of detecting the turning off of the ignition (IG) switch or the wireless communication portion capable of detecting the approach of the smart key 60 or the security cancellation operation by the smart key 60 may be illustrated, or the case of a switch group formed of a combination thereof may be illustrated.

Figure 5:
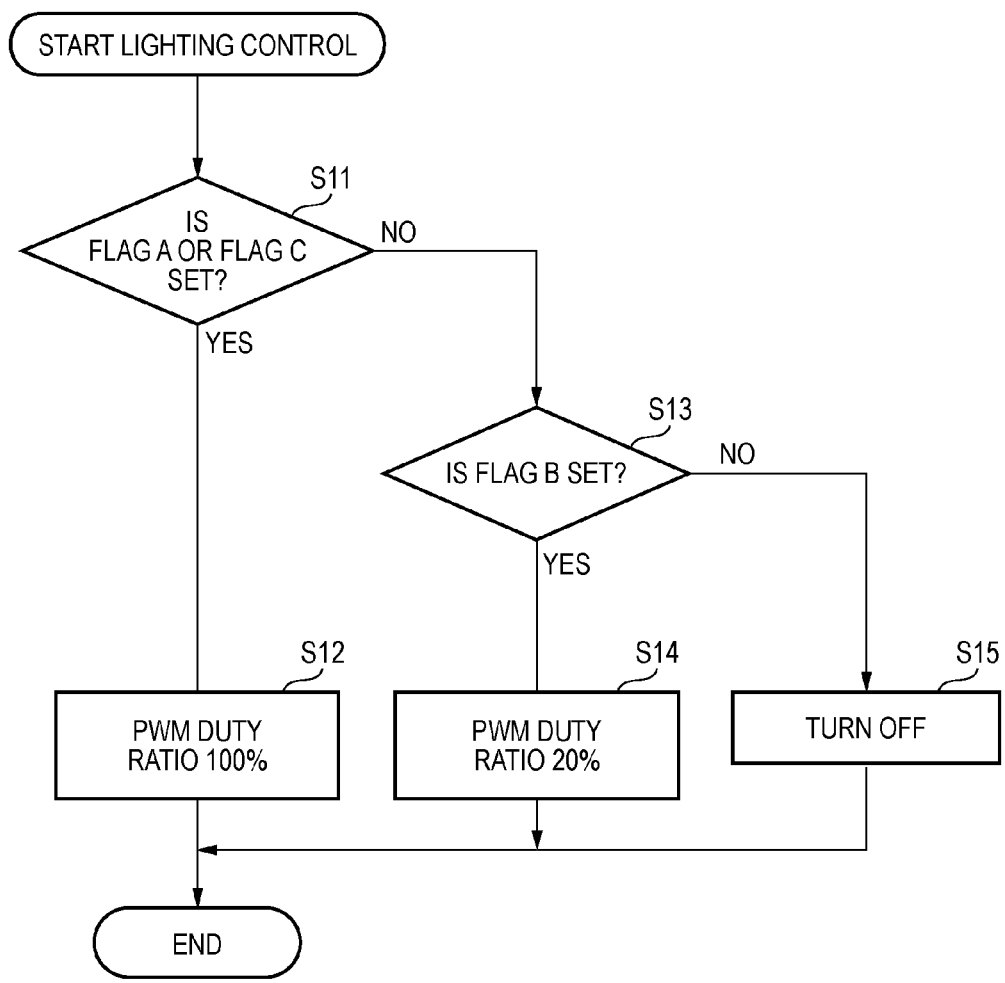
FIG. 5 is a flowchart illustrating a lighting control procedure.

FIG. 5 is a flowchart illustrating a lighting control procedure. This operation program is stored in the ROM in the controller 15, and executed by the CPU in the controller 15.

First, the controller 15 determines whether the flag A or the flag C stored in the flag memory 15z is set to value 1 or not (S11). When the flag A or the flag C is set to value 1, the controller 15 selects the corresponding personal lamp 20 based on the information stored in the flag memory 15z, and lights the personal lamp 20 with the high illuminance (light amount 100%) (S12). For example, when the personal switch 39 close to the rear seat 11 on the right side is turned on by a passenger or when the door is unlocked, the personal lamp 31 is lit with the high illuminance. In the case of the light amount 100%, the controller 15 drives the personal lamp 20 at a duty ratio of 100%. Thereafter, the controller 15 ends the present operation.

On the other hand, when both the flag A and the flag C are reset to value 0 at step S11, the controller 15 determines whether the flag B is set to value 1 or not (S13). When the flag B is set to value 1, the controller 15 selects the corresponding personal lamp 20 based on the information stored in the flag memory 15z, and lights the personal lamp 20 with the low illuminance (light amount 20%) (S14). In the case of the light amount 20%, the controller 15 drives the personal lamp 20 at a duty ratio of 20%. Thereafter, the controller 15 ends the present operation.

On the other hand, when the flag B is reset to value 0 at step S13, the controller 15 turns off all the personal lamps 20 (S15). That is, the controller 15 drives the personal lamps 20 at a duty ratio of 0%. Thereafter, the controller 15 ends the present operation.

The light amounts 100% and 20% set as the high illuminance and the low illuminance, respectively, are an example, and a different combination such as light amounts 90% and 10% may be adopted. Moreover, the light amount of the personal lamp may be adjustable in several steps by a manual operation by a passenger, or may be adjusted to a value other than the light amount 100%. Conversely, when the lounge mode is not set, the adjustment to the light amount 20% by a manual operation may be disabled. This is because there is hardly any request for the setting to such a low illuminance.

In this vehicle interior illumination device 10, the personal lamps 29 and 31 and the personal switches 38 and 39 are disposed on the trim covers above the sides of the middle seats 7 and 9 and the rear seat 11 in the rear vehicle interior 6, respectively. When the lounge mode setting switch 40 disposed on the instrument panel 18 is turned on by the driver, the vehicle interior illumination device 10 shifts to the lounge mode. In the lounge mode, for example, when a passenger sitting on a middle seat or the rear seat performs reading, the personal lamp 20 illuminating this seat as the functional illumination is lit by turning on the personal switch 30. On the other hand, when the personal switch 30 is off and the door switch 52 and the like detecting operations interlocking with the vehicle are also off, the personal lamps 20 perform the atmospheric illumination in the lounge mode.

Moreover, since the personal lamp operates as an illumination lamp used for both the functional illumination (light amount 100%) and the atmospheric illumination (light amount 20%), it is unnecessary to increase the number of illumination lamps compared with when a lamp for the functional illumination and a lamp for the atmospheric illumination are separately provided. That is, the illumination lamp necessary for the functional illumination can be used for the atmospheric illumination.

Thereby, the functional illumination with the high illuminance and the atmospheric illumination with the low illuminance can be used each in its proper way by using a personal lamp capable of being turned on at the side of the middle seats and the rear seat in the rear without any increase in the number of illumination lamps. Moreover, by placing priority on the functional illumination, the atmospheric illumination can be easily introduced without any significant changes from the usage of the conventional illumination lamp.

Moreover, the entire vehicle interior from the driver's seat side to the middle seat and the rear seat side can be uniformly illuminated, so that the atmospheric illumination can be made more effective.

Moreover, only when the door switch and the like interlocking with the vehicle are off and the personal switch is off, the controller lights the personal lamp in the lounge mode (light amount 20%). For example, when a door is half-shut on the rear seat side, shift to the lounge mode is not made, and the corresponding personal lamp is lit with the high illuminance as the functional illumination. As described above, operations interlocking with the vehicle such as door opening in addition to operations of the personal switches by passengers bring a condition where the personal lamp is lit and the role as the functional illumination can be fulfilled as before.

Moreover, since the personal lamp is lit with the low illuminance by instructing the low illuminance mode by the lounge mode setting switch, the driver can freely set the atmospheric illumination. Moreover, when the low illuminance mode is set, when the low illuminance mode is canceled and then set again, that is, at times other than at the time of the functional illumination, the illumination is always the atmospheric illumination. Moreover, since a plurality of personal lamps are concurrently lit with the low illuminance, the effect as the atmospheric illumination can be enhanced.

The technical scope of the present invention is not limited to the above-described embodiment. The above-described embodiment may be accompanied by various modifications, improvements and the like within the technical scope of the present invention.

For example, while in the above-described embodiment, when the switches detecting operations interlocking with the vehicle and all the personal switches are off, the controller 15 shifts to the lounge mode and the personal lamps are lit with the low illuminance as the atmospheric illumination, the present invention is not limited to this case; for example, even if one or two personal switches are on, when the remaining personal switches are off, the corresponding personal lamps may be lit as the atmospheric illumination, or except for the personal lamps corresponding to the personal switches that are on, the remaining personal lamps may be lit as the atmospheric illumination.

Now, features of the embodiment of the vehicle interior illumination device according to the above-described present invention are briefly summarized and listed in the following [1] to [6].

[1] A vehicle interior illumination device (10) mounted on a vehicle, includes:

an illumination lamp (personal lamps 20, 25, 27, 29, 31) that is provided in a vehicle interior and is configured to be turned on to illuminate the vehicle interior;

a detector (door switch 52) that detects a condition to have the illumination lamp to be turned on; and a controller (15) that controls a lighting of the illumination lamp, wherein when the condition is detected by the detector, the controller lights the illumination lamp with a first light amount and when the condition is not detected by the detector, the controller lights the illumination lamp with a second light amount smaller than the first light amount.

[2] The vehicle interior illumination device according to the above [1], wherein the illumination lamp is provided in the vehicle interior on a side of a seat in a rear of a driver seat and is configured to be turned on to illuminate the side of the seat in the rear of the driver seat; and wherein the vehicle interior on a side of the driver seat is a space not light-intercepted from the vehicle interior on the side of the seat in the rear of the driver seat.

[3] The vehicle interior illumination device according to the above [1] or [2], wherein the detector detects an operation for turning on the illumination lamp or an operation interlocking with a vehicle as the condition to have the illumination lamp to be turned on.

[4] The vehicle interior illumination device according to any of the above [1] to [3], further includes a instruction portion (lounge mode setting switch 40) that is configured to instruct a low illuminance mode for lighting the illumination lamp with the second light amount, wherein when the low illuminance mode is instructed by the instruction portion and the condition is not detected by the detector, the controller lights the illumination lamp with the second light amount.

[5] The vehicle interior illumination device according to the above [4], wherein when the condition is detected by the detector while the illumination lamp is lit with the second light amount, the controller cancels the low illuminance mode and lights the illumination lamp with the first light amount, and thereafter, when the condition becomes undetected, the controller sets the low illuminance mode again and lights the illumination lamp with the second light amount.

[6] The vehicle interior illumination device according to the above [4] or [5], wherein the controller concurrently lights a plurality of illumination lamps with the second light amount.

What is claimed is:

1. A vehicle interior illumination device, comprising:
   an illumination lamp that is provided in a vehicle interior and is configured to be turned on to illuminate the vehicle interior;
   a detector that detects a condition to have the illumination lamp to be turned on; and
   a controller that controls a lighting of the illumination lamp,
   wherein when the condition is detected by the detector, the controller lights the illumination lamp with a first light amount and when the condition is not detected by the detector, the controller lights the illumination lamp with a second light amount smaller than the first light amount,
   wherein the illumination device further comprises an instruction portion that is configured to instruct a low illuminance mode for lighting the illumination lamp with the second light amount, and
   wherein when the low illuminance mode is instructed by the instruction portion and the condition is not detected by the detector, the controller lights the illumination lamp with the second light amount.

2. The vehicle interior illumination device according to claim 1, wherein the illumination lamp is provided in the vehicle interior on a side of a seat in a rear of a driver seat and is configured to be turned on to illuminate the side of the seat in the rear of the driver seat; and
   wherein the vehicle interior on a side of the driver seat is a space not light-intercepted from the vehicle interior on the side of the seat in the rear of the driver seat.

3. The vehicle interior illumination device according to claim 1, wherein the detector detects an operation for turning on the illumination lamp or an operation interlocking with the vehicle as the condition to have the illumination lamp to be turned on.

4. The vehicle interior illumination device according to claim 1, wherein when the condition is detected by the detector while the illumination lamp is lit with the second light amount, the controller cancels the low illuminance mode and lights the illumination lamp with the first light amount, and thereafter, when the condition becomes undetected, the controller sets the low illuminance mode again and lights the illumination lamp with the second light amount.

5. The vehicle interior illumination device according to claim 1, wherein the controller concurrently lights a plurality of interior illumination lamps with the second light amount.

6. The vehicle interior illumination device of claim 1, wherein said first and second light amounts are greater than a zero light amount.

7. A vehicle interior illumination device comprising:
   an illumination lamp that is provided in a vehicle interior and is configured to be turned on to illuminate the vehicle interior;
   a detector that detects a condition to have the illumination lamp to be turned on; and
   a lounge mode setting switch; and
   a controller that controls lighting of the illumination lamp,
   wherein the controller is configured to determine whether the lounge mode setting switch has been activated,
   wherein when the condition is detected by the detector, the controller lights the illumination lamp with a first light amount,
   wherein when the condition is not detected by the detector, and the lounge mode setting switch has been activated, the controller lights the illumination lamp with a second light amount smaller than the first light amount, and
   wherein when the condition is not detected by the detector, and the lounge mode setting switch has not been activated, the controller turns off the illumination lamp.

* * * * *